United States Patent

Bennett et al.

Patent Number: 5,534,606
Date of Patent: Jul. 9, 1996

[54] RIGID CYCLOOLEFIN COPOLYMER FILM

[75] Inventors: Cynthia Bennett, Alzey; Michael-Joachim Brekner, Frankfurt am Main; Otto Herrmann-Schoenherr, Bensheim; Frank Osan, Kelkheim, all of Germany

[73] Assignee: Hoechst Aktiengesellschaft, Frankfurt am Main, Germany

[21] Appl. No.: 195,084

[22] Filed: Feb. 14, 1994

[30] Foreign Application Priority Data

Feb. 12, 1993 [DE] Germany ............ 43 04 308.9

[51] Int. Cl.$^6$ .................................... C08F 32/08
[52] U.S. Cl. .............. 526/281; 526/127; 526/132; 526/282; 526/336; 526/339; 526/340; 526/348.1
[58] Field of Search ................... 526/281, 160, 526/308, 282

[56] References Cited

U.S. PATENT DOCUMENTS

| | | | |
|---|---|---|---|
| 5,087,677 | 2/1992 | Brekner | 526/160 |
| 5,218,049 | 6/1993 | Yamamoto | 525/97 |

FOREIGN PATENT DOCUMENTS

| | | |
|---|---|---|
| 0384694 | 8/1990 | European Pat. Off. |
| 0407870 | 1/1991 | European Pat. Off. |
| 0485893 | 5/1992 | European Pat. Off. |
| 0503422 | 9/1992 | European Pat. Off. |
| 530767 | 3/1993 | European Pat. Off. |
| 224538 | 7/1985 | Germany. |
| 241971 | 1/1987 | Germany. |

OTHER PUBLICATIONS

Fritzsche, Dr. Christoph, "Torsions–schwingungsmessungen an Kunststoffen", *Kunststoffe–Plastics*, vol. 21 (1974).

*Primary Examiner*—Fred Zitomer
*Attorney, Agent, or Firm*—Foley & Lardner

[57] ABSTRACT

A rigid single- or multilayer non-oriented or mono- or biaxially oriented film in which at least one layer comprises a cycloolefin copolymer, wherein the cycloolefin copolymer has an intrinsic E modulus ($E_i$) which has the following dependence on the glass transition temperature $T_g$:

$$E_i = (0.0025[GPa/°C.] \times T_g[°C.]) + B[GPa]$$

where $B=2.93-3.19$ and $T_g$ is the glass transition temperature.

17 Claims, 3 Drawing Sheets

RIGID CYCLOOLEFIN COPOLYMER FILM

BACKGROUND OF THE INVENTION

1. Field of Invention

The invention relates to rigid films of cycloolefin copolymers, a process for the production of such films and their use, in particular, for the production of thermoformed components.

2. Description of Related Art

Cycloolefin copolymers have the following properties that are advantageous specifically for films:
- high transparency (for optical uses)
- good dielectric properties (as a capacitor dielectric)
- high softening points, in particular, at a high cycloolefin content (for high temperature uses) and
- good gas barriers (for uses in the packaging sector).

Films prepared from cycloolefin copolymers are known. DD-A 224 538 and DD-A 241 971 describe cast films of ethylenenorbornene copolymers. EP-A 0 384 694 also describes films of cyclic copolymers. Except for the norbornene copolymers, other cycloolefinic starting materials mentioned therein are comparatively expensive and therefore uneconomical.

One disadvantage of the known cycloolefin copolymer films is that the E modulus, in particular, the tensile E modulus, is too low for the production of extremely thin films. The E modulus has a direct influence on the winding properties of a film. The lower the E modulus, the greater the risk that irreversible extensions occur due to tensile stresses generated during winding of the film.

Some cycloolefin copolymers that may be suitable for the production of the films according to the invention are described in EP-A 0 407 870, EP-A-0 503 422 and in DE-A 40 36 264 the disclosures of which are incorporated by reference herein. These documents also mention that films can be produced from these raw materials. These documents also include, however, many cycloolefin copolymers that are not suitable for the production of films according to the invention since they are too ductile, and an optimum E modulus at the lowest possible film thickness is not achieved. Suitable mechanisms for preparing cycloolefin copolymers having the specific microstructure described below are not described in these documents.

SUMMARY OF THE INVENTION

It is an object of the present invention to produce more rigid cycloolefin copolymer films which are easier to handle as extremely thin films and are suitable, for example, for use as a capacitor dielectric. It also is an object of the invention to utilize cycloolefin copolymer films for more rigid thermoformed components, e.g., for the production of thinner components having the same rigidity thereby saving material.

In accordance with these objectives, there is provided cycloolefin copolymers having a specific microstructure that permit the production of oriented cycloolefin copolymer films having a particularly high E modulus. The specific microstructure of these cycloolefin copolymers is characterized by a relatively high stereotacticity with respect to the conventional cycloolefins. The preferred conformation of the copolymeric chain prevents chains sliding past one another under small elongations thereby resulting in a higher rigidity (a higher E modulus) as a material property.

The rigidity according to the present invention is defined below as meaning that the non-oriented cycloolefin copolymer used for the production of a film of the present invention has an intrinsic E modulus which depends upon the glass transition temperature ($T_g$) of the cycloolefin copolymer according to the equation:

$$E_i = (0.0025[GPa/°C.] \times T_g[°C.]) + B[GPa]$$

where $B=2.93-3.19$, $E_i$ is the intrinsic E modulus and $T_g$ is the glass transition temperature of the cycloolefin copolymer.

Cycloolefin copolymers are suitable for the production of films according to the invention when these polymers meet the above-mentioned condition. The $E_i$ value serves as evidence of the polymeric microstructure of the cycloolefin copolymer used in accordance with the invention.

In accordance with another aspect of this invention, there is provided a film wherein the $^{13}$C-NMR spectrum of the cycloolefin copolymer which makes up at least one layer of the film according to the invention has a characteristic peak at 40.8 ppm, in addition to other differences.

In accordance with an additional embodiment of the invention, there is provided a capacitor dielectric, an electrical insulation, a packaging film, a reproduction film or a display window for LED cells each comprising a film containing cycloolefin copolymers meeting the aforementioned conditions.

In accordance with an additional embodiment of this invention there is provided a method of making a film having at least one layer comprising a cycloolefin copolymer meeting the above relation comprising the steps of, polymerizing a cycloolefin with an olefin in the presence of a metallocene catalyst to produce a cycloolefin copolymer, separating the cycloolefin copolymer and forming a film from the copolymer.

Further objects, features and advantages of the invention will become apparent from the detailed description of preferred embodiment which follows.

DETAILED DESCRIPTION OF PREFERRED EMBODIMENTS

Figure 1:
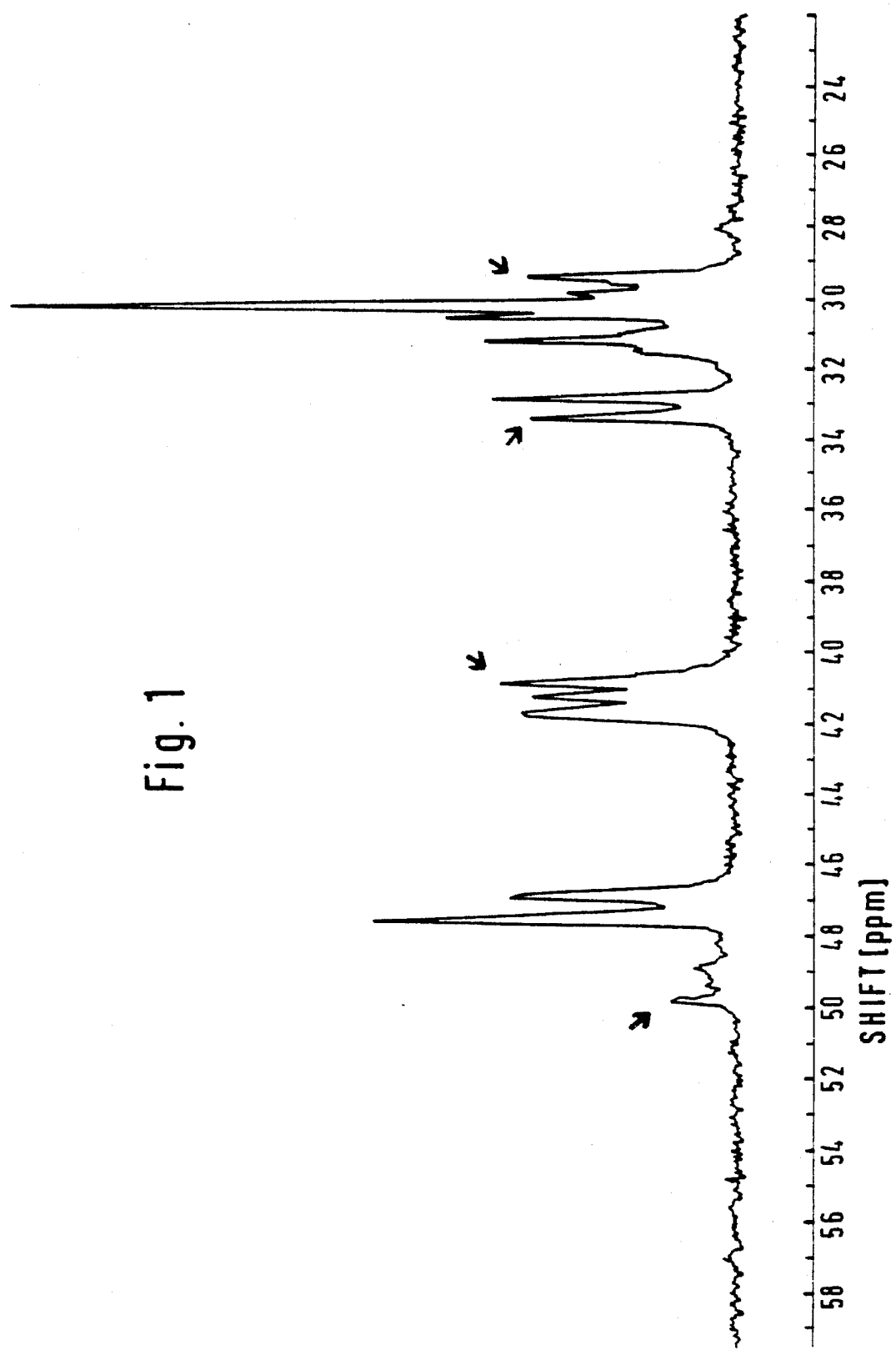
FIG. 1 illustrates a $^{13}$C-NMR spectrum for cycloolefin copolymers of the present invention.

The films according to the invention may comprise any cycloolefin copolymer meeting the above relation. Preferably, at least one layer is built up chiefly, i.e., to the extent of at least 50% by weight, preferably at least 90% by weight, and more preferably at least 95% by weight, (based on the weight of the layer), of a cycloolefin copolymer which preferably comprises the recurring units (I) and (II)

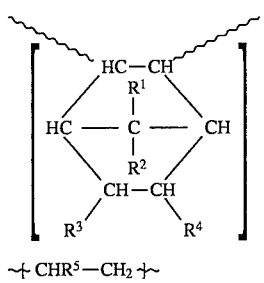

(I)

$-\!\!+\!\text{CHR}^5-\text{CH}_2\!+\!\!-$ (II)

The films of the present invention may further comprise a cycloolefin copolymer having additional recurring units (III) and/or (IV) and/or (V)

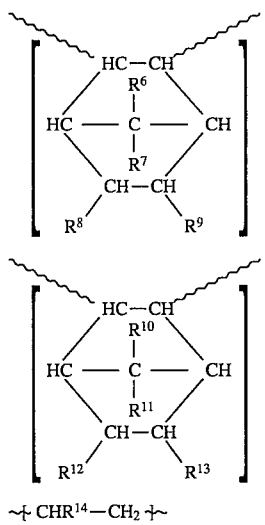

(III)

(IV)

$-\!\!+\!\text{CHR}^{14}-\text{CH}_2\!+\!\!-$ (V)

in which (III) is not identical to (I), $R^1$ to $R^5$ are the same or different and may be H, aryl, $C_1$–$C_{10}$-alkyl or $C_3$–$C_{10}$-cycloalkyl and in which $R^6$ to $R^{24}$ are the same or different and may have the meaning of $R^1$ to $R^5$, or may be $C_2$–$C_{10}$-alkylene or $C_3$–$C_{10}$-cycloalkenyl, and in which the radical pairs $R^6/R^7$, $R^8/R^9$, $R^{10}/R^{11}$ and/or $R^{12}/R^{13}$ in each case may be bonded to one another and, together with the carbon atoms to which they are bonded, may be a $C_4$–$C_{10}$-cycloalkyl or $C_4$–$C_{10}$-cycloalkenyl radical, which in turn may be bridged by a —C($R^1$,$R^2$)-radical, in which $R^1$ and $R^2$ have the meanings given above for $R^1$ to $R^5$.

In a preferred embodiment of the invention, $R^1$, $R^2$, $R^3$, $R^4$ and $R^5$ are H.

In an additional embodiment of the present invention, monomers that contain at least two double bonds, i.e., at least one of $R^6$ to $R^{14}$ is unsaturated, can be used. Long chain branching by, for example, incorporation of a side chain having a second double bond, can be effected by suitable choice of the polymerization conditions (for example a sufficiently long reaction time to achieve a high conversion). Such polymers are particularly suitable for the production of blown films. On the other hand, if the polymerization conditions are chosen such that unreacted double bonds remain in the polymer, i.e., one or more of $R^6$ to $R^{14}$ is or are unsaturated, these double bonds can be utilized for subsequent branchings or for crosslinking. Such crosslinking is useful for fixing the dimension of the film or of the thermoformed component, or for chemical modification, such as use for the introduction of polar groups (for example hydroxyl or carboxyl groups) by oxidation of the double bond.

The content of recurring units of the formula (I) in the cycloolefin copolymer may be 5–95 mol %, preferably 20–70 mol %. The content of recurring units of the formula (II) in the cycloolefin copolymer may be 95–5 mol %, preferably 30–80 mol %. The recurring unit of the formula (III) optionally is present and can generally be present in the polymer in an amount of 0–5 mol %, preferably 0–3 mol %. The recurring unit of the formula (IV) likewise optionally is present and can generally be present in the polymer in an amount of 0–5 mol %, preferably 0–3 mol %. The recurring unit of the formula (V) likewise optionally is present and can generally be contained in the polymer in an amount of 0–5 mol %, preferably 0–3 mol %. All the above-mentioned mol % data relate to the weight of the cycloolefin copolymer employed. The sum of all of the contents of the recurring units in mol % (I), (II), (III), (IV) and (V) is 100 mol %.

The molar contents of the structures (I), (II), (III), (IV) and (V) influence the glass transition temperature ($T_g$) of the resulting cycloolefin copolymers. In copolymers that include exclusively the recurring units of the formulae (I) and (II), in which (II) is ethylene, a molar content of 25 mol % of (I) leads to a $T_g$ of about 50° C.; a molar content of 65% by weight of (I) leads to a $T_g$ of about 200° C. Other monomer compositions have similar properties, i.e., higher molar contents of recurring units of the formula (I) lead to higher glass transition temperatures. Upon review of the present specification, varying the amounts of recurring units (I) to (V) to affect the $T_g$ is within the routine skill of those skilled in the art.

Glass transition temperatures of 50°–250° C., in particular 80°–200° C., are particularly preferred for the rigid films according to the invention.

Some selected bridged metallocene catalyst systems, such as those described in DE-A 40 36 264 and EP-A 0 407 870, can be used for the preparation of the cycloolefin copolymers of the present invention. The choice of catalyst and of the polymerization conditions should be selected carefully to achieve the microstructure according to the invention. Methylaluminoxane/diphenylmethylene-(cyclopentadienul)-(9-fluorenyl)-zirconium dichloride or isopropylene-(cyclopentadienyl)-(9-fluorenyl)-zirconium dichloride systems have proven to be suitable. However, other catalysts also are suitable for the preparation of the inventive polymers, as long as the microstructure according to the invention is obtained. Two examples of catalysts that do not necessarily result in the preparation of polymer having the desired microstructure are rac-dimethylsilyl-bis-(1-indenyl)-zirconium dichloride and isopropylene-(cyclopentadienyl)-(1-indenyl)-zirconium dichloride.

The cycloolefin copolymers can be prepared by, inter alia, the process described in DE-A 40 36 264. Those skilled in the art, upon review of the present specification, are capable of utilizing the methods described in DE-A 40 36 264 to prepare cycloolefin copolymers of the present invention.

The cycloolefin copolymers of the invention can be prepared by introducing the cycloolefin and the olefin into a polymerization reactor, adding a dissolved or suspended catalyst system and then bringing the mixture to the reaction temperature. The incorporation ratio of the monomers in the polymer and therefore the glass transition temperature of the polymer can be controlled by suitable choice of the reaction temperature. The pressure of the usually gaseous olefin typically is expediently kept constant during the polymerization in order to achieve a uniform incorporation rate. When the reaction has ended, the catalyst is deactivated, for example, by addition of an alcohol, and separated from the polymer. The skilled artisan is capable of varying reaction conditions to synthesize a copolymer meeting the limitations of the present invention.

The presence of the microstructure according to the invention can be demonstrated either via the intrinsic E modulus ($E_i$) or by means of the $^{13}$C-NMR spectrum. The microstructure of the copolymers of the invention also can be shown to be present via the mechanical properties of the polymer in a tensile test. To carry out the tensile test, it is preferable that the specimen comprises not more than 2% of additives or other polymers, is sufficiently thick and is completely isotropic, i.e., shows no orientation. If an excess of foreign substances are present, the properties of the mixture are measured and not the intrinsic tensile E modulus values of the cycloolefin copolymer.

The intrinsic E modulus value $E_i$ is determined at very low elongations (less than 0.1%, preferably from 0.03 to 0.05%). As a general rule, it is not possible for very thin and therefore flexible films having a thickness of considerably less than 1 mm, to be introduced sufficiently evenly and without distortion into the tensile elongation clamping head to thereby determine the elongations sufficiently accurately. The determination of the $E_i$ value should therefore be carried out on specimens having a minimum thickness of 1 mm.

Since the orientation of the specimens can increase the tensile E modulus values, these specimens should be converted into the isotropic state before measurement of the intrinsic properties. This isotropization can be effected by heat treatment for at least 30 minutes at 20° C. above the $T_g$. As an alternative to heat treatment of film specimens, non-oriented injection moldings can also be produced from the polymer to serve as $E_i$ measurement specimens.

The intrinsic E modulus ($E_i$) is an E modulus value determined in accordance with DIN 53 547 at an elongation of <0.1%. To be capable of measuring the elongation sufficiently accurately, the tensile elongation tester should be equipped with sufficiently accurate displacement transducers (resolution about 1 μm). Optical or scanning displacement transducers may be suitable for this, but traversing displacement transducers as a rule are not.

The rigid films according to the invention comprise cycloolefin copolymers and the intrinsic tensile E modulus values of the invention films depend on the particular $T_g$ of the polymer according to the following equation:

$$E_i = (0.0025[Gpa/°C.] \times T_g[°C.]) + B[GPa]$$

where B=2.93–3.18 and $T_g$ is the glass transition temperature of the copolymers.

Films that are not in accordance with the present invention typically have $E_i$ values that are lower than those of the inventive films. The intrinsic tensile E modulus value of a cycloolefin copolymer is determined by the microstructure of the chain build-up, in a similar manner to that in which the tactility of other polymers influences their mechanical properties. At the same $T_g$, which means approximately the same molar contents of the monomers, the polymers according to the invention have a higher intrinsic tensile E modulus than conventional cycloolefin copolymers.

These intrinsic E modulus values ($E_i$) of the polymer also influence the mechanical properties of the film, especially when the film is oriented. It is known that the rigidity of moldings, including films, also is increased by orientation. An oriented film that is not in accordance with the invention can indeed have a higher rigidity than a non-oriented film according to the invention. However, if films having the same degree of orientation, molar composition and $T_g$ are compared with one another, the film according to the invention will have a higher rigidity (E modulus) than a cycloolefin copolymer film which is not according to the invention. The higher the orientation of the films or moldings, the higher the elongation range in which this increased rigidity has an effect. In the case of non-oriented films or moldings, the increased rigidity typically is detectable by the $E_i$ value and rarely by the tensile modulus value, whereas for the rigidity also can be measurable by the tensile E modulus oriented films or moldings. The films according to the invention also exhibit improved modulus values under the influence of heat.

The rigidity of an oriented film also typically is stated as the E modulus value, but this is not the same as the values defined herein as the intrinsic E modulus values ($E_i$). In films, the E modulus values must be measured at higher elongations because of the already mentioned difficulties due to clamping in the clamping jaws of the tensile testers. The E modulus of the film specimens usually is determined at between 0.3 and 0.5% elongation, i.e., at ten times the elongation of which the intrinsic E modulus is determined. In principle, these E modulus measurements, which are made at higher elongations on oriented specimens, give different values than the intrinsic values measured at low elongations on non-oriented specimens. Whether these film values are higher or lower than the intrinsic values depends on the degree of orientation. At a high orientation (such as is obtained, for example, at stretching ratios of about >1.5), the film value is higher than the intrinsic value measured on non-oriented specimens. At a low orientation (such as, for example, about 1.0–1.5) the intrinsic value is higher than the film value. Those skilled in the art are capable of determining the intrinsic-modules ($E_i$) in accordance with the guidelines provided herein.

Figure 2:
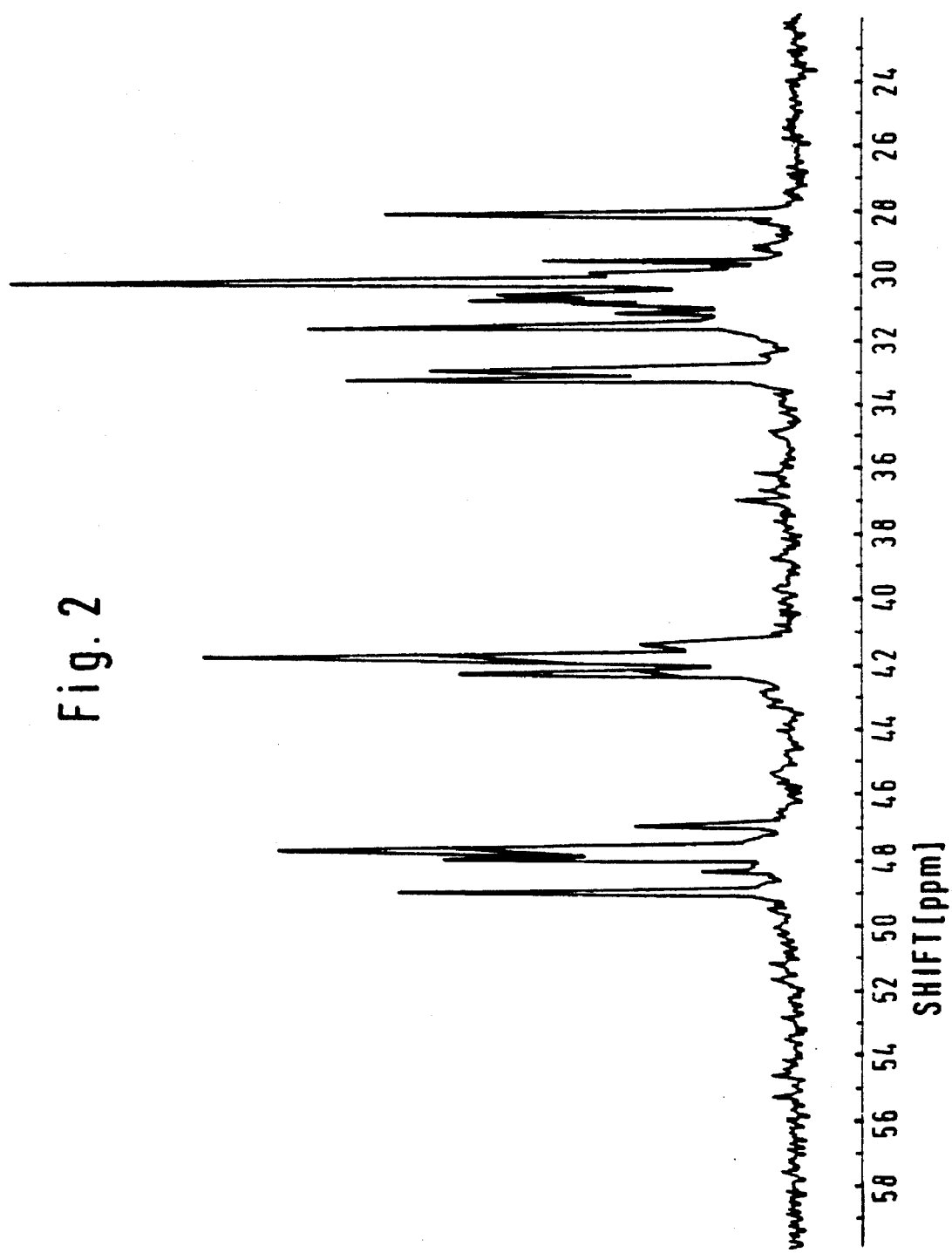
FIG. 2 illustrates a $^{13}$C-NMR spectrum for cycloolefin copolymers not having the microstructure of the present invention.

The microstructure of the cycloolefin copolymers of the invention causes characteristic peaks in the $^{13}$C-NMR spectrum. FIG. 1 illustrates a typical spectrum of cycloolefin copolymers having the microstructure according to the invention. FIG. 2 illustrates, for comparison, a spectrum of a cycloolefin copolymer without the microstructure according to the invention. The spectra of FIGS. 1 and 2 show some common peaks and differences, the differences most likely attribute to a different steric build-up of the polymers ("tactility"). The specific microstructure of cycloolefin copolymers of the invention results in the following common characteristic peaks:

| Common Peaks (ppm) | Characteristic Peaks (ppm) |
| --- | --- |
| 47.5 | 49.8 |
| 46.8 | |
| 41.7 | 40.8 |
| 32.8 | 33.3 |
| 30.1 | 29.3 |

Since the position of the individual peaks can vary somewhat as a function of the recording conditions of the spectra, the peaks that are common in all of the spectra serve as reference points. The heights of the particular peaks vary according to the monomer composition, but the positions are characteristic. The peaks at 29.3, 33.3, 40.8 and 49.8 ppm are unambiguous for the microstructure according to the invention. (The peaks mentioned are characteristic of the specific microstructure, but the spectra as a rule also contain other peaks). Additives or impurities can lead to additional peaks in a spectrum. Spectra of the polymers to be employed according to the invention, therefore, also can contain additional peaks.

An advantage of the present invention is that use of cycloolefin copolymers having the above-mentioned microstructure results in more rigid films, for a given degree of orientation, than corresponding films of cycloolefin copolymers having a different microstructure or no microstructure.

In a preferred embodiment, the film comprises fine inert particles which improve the slip and winding properties. Such particles, which can be present in amounts of 0–1%, include for example, $SiO_2$, $Al_2O_3$, silicates having an $SiO_2$ content of at least 30% by weight, amorphous and crystalline alumina minerals, aluminosilicates, oxides of Mg, Zn, Zr and Ti, sulfates of Ca, Mg and Ba, phosphates of Li, Na and Ca (including the monohydrogen salts and dihydrogen salts thereof), benzoates of Li, Na and K, terephthalates of Ca, Ba, Zn and Mn, titanates of Mg, Ca, Ba, Zn, Cd, Pb, Sr, Mn, Fe, Co and Ni, chromates of Ba and Pb, carbon (for example carbon black or graphite), glass (glass powder and glass beads), carbonates of Ca and Mg, fluorspar, sulfides of Zn and Mo, organic polymer substances such as polytetrafluoroethylene/polyethylene, talc, lithium fluoride and the Ca, Ba, Zn and Mn salts of organic acids.

The films of the present invention also can contain suitable additives including stabilizers, lubricants or antioxidants. Useful additives for polyolefins including polyethylene or polypropylene also are suitable for cycloolefin copolymer films. Useful UV stabilizers include, for example, absorbers, such as hydroxyphenylbenzotriazoles, hydroxybenzophenones, formamidine or benzylidene-camphor, quenching agents, such as cinnamic acid esters or nickel chelates, agents which trap free radicals, such as sterically hindered phenols, hydroperoxide-destroying agents, such as nickel complexes or zinc complexes of sulfur-containing compounds, or light stabilizers of the HALS type, and mixtures thereof. Useful lubricants include fatty acids and esters, amides and salts thereof, silicones or waxes, such as PP waxes or PE waxes. Antioxidants which can be added include agents which trap free radicals, such as substituted phenols and aromatic amines, and/or peroxide-destroying agents, such as phosphites, phosphonates and thio compounds.

The film according to the present invention also can be a single- or multilayer film. At least one layer comprises mainly, i.e., to the extent of at least 85% by weight, preferably to the extent of 90–100% by weight, the cycloolefin copolymers described above. The monofilm is a preferred embodiment.

In an additional embodiment of the invention, the main layer according to the invention carries one or two thin polymer top layers having lower glass transition temperatures than the main layer, preferably at least 20° lower. Cycloolefin copolymers are preferably used in the top layer, but these top layers do not necessarily include cycloolefin copolymers having the specific microstructure of those used in the main layer. In addition, the film can be coated for modification of its properties.

The film according to the invention can comprise other compatible or non-compatible polymers to improve its properties. These polymers can form separate layers or be mixed with the cycloolefin copolymer. Examples of such polymers include polyethylene, polypropylene, polymethylbut-1-ene, poly(4-methylpent-1-ene), polybut-1-ene and polystyrene, polyvinyl chloride, polyvinylidene chloride, polyvinyl fluoride, polytetrafluoroethylene, polychloroprene, polyacrylate, polymethacrylate, polyacrylamide, polyacrylonitrile, acrylonitrile/butadiene/styrene copolymers, acrylonitrile/styrene copolymers and acrylonitrile/styrene/acrylate copolymers, polyvinyl alcohol, polyvinyl acetate, polyvinyl stearate, polyvinyl benzoate, polyvinyl maleate, polyvinylbutyral, polyallyl phthalate, polyallyl melamine, copolymers of the above-mentioned monomers, such as ethylene/vinyl acetate copolymer, polyethylene oxide and polymers of bis-glycidyl ethers, polyoxymethylene, polyoxyethylene and polyoxymethylene/ethylene oxide copolymers, polyphenyl oxide polymers, polycarbonates, polysulfones, polyurethanes, nylon 6, nylon 66, nylon 11 and nylon 12, polyethylene terephthalate, polybutylene terephthalate and poly-1,4-dimethylolcyclohexane terephthalate, polyethylene naphthalate, polyethylene naphthalate bibenzoate, phenol-formaldehyde resins and melamine-formaldehyde resins, cellulose, cellulose propionates and cellulose ethers and proteins.

The films can be produced by various processes. Casting from solution is possible, but thermoplastic processing generally is more advantageous. Pressing of sheets is particularly suitable for experimental use, but continuous processes, such as extrusion or calendaring, are more economical for industrial production.

Extruded films can be shaped as a tube or flat film. Coextrusion is advisable for the production of multilayer films. Those skilled in the art are familiar with these film-forming techniques.

The films often are oriented for improving the mechanical properties further. This is effected by stretching. The stretching temperatures should expediently be in a temperature range from 40° C. below the glass transition temperature $(T_g-40°\ C.)$ to 50° C. above the glass transition temperature $(T_g+50°\ C.)$. Thus, the stretching temperature should satisfy the following relation: $(T_g-40°\ C.) \leq T_g \leq (T_g+50°\ C.)$. The orientation can be uniaxial or biaxial.

Stretching temperatures above the $T_g$ are suitable for industrial production because this allows faster production because of the higher stretching speeds which can be achieved. The temperature, stretching rate and stretching ratios should be coordinated with one another such that the film does not tear. The stretching speed preferably is 1–500,000%/minute. The stretching ratios in the longitudinal and transverse directions are in each case 1.1:1–10:1, preferably 1.5:1–4:1. The area stretching ratio should preferably be 3–20.

If stretching is carried out above $T_g$, the stretched film should rapidly be cooled to below $T_g$ after stretching has taken place. Otherwise, there is the risk that the orientation is lost by relaxation. This process measure is more critical with amorphous cycloolefin copolymers than with partly crystalline cycloolefin copolymers.

In the case of biaxial orientation, the stretching can be carried out simultaneously or sequentially. Tenter processes are suitable for flat films, as well as simultaneous stretching frames. Tubular films typically are oriented biaxially by inflation with simultaneous longitudinal take-off.

Oriented amorphous films can be employed as shrink films. Non-oriented or only slightly oriented films find use for the production of thermoformed components.

The surfaces of the films can be modified to achieve, for example, adhesion promotion or printability or antistatic or antiadhesion properties. This modification can be effected either by treatment methods such as corona, flame, plasma or oxidation treatment, or by application of a coating from a solution or dispersion.

The films of the present invention also find use in preparing capacitor dielectrics, electrical insulations, packaging films, reproduction films or display window for LED cells. Those skilled in the art recognize how to use polymer films for the above-mentioned purposes.

The invention will be illustrated in more detail in the following with the aid of non-limiting examples.

EXAMPLES

The following analytical methods were used in the examples which follow.

Those skilled in the art are familiar with the following techniques and are capable of measuring the following characteristic using those techniques.

The glass transition temperature ($T_g$) was determined as the sudden increase in thermal capacity in the DSC diagram. The DSC diagrams were recorded using a Perkin-Elmer DSC 7.

The viscosity number (VN) was determined in accordance with DIN 53 728 in decalin at 135° C.

The mechanical properties of the films were investigated with a tensile tester 1445 from Zwick on specimens 15 mm wide over a clamped length of 100 mm. The tensile E modulus was determined in the elongation range from 0.3 to 0.5% at an elongation speed of 10 mm/minute. The tear strength and elongation at break were determined at 100 mm/minute.

The $E_i$ value (intrinsic modulus) was determined on injection moldings in accordance with DIN 53 457 in a tensile tester from Zwick with a mechanically scanning change-in-length transducer. $E_i$ was determined as the E modulus between 0.03 and 0.05% elongation.

Example 1

Preparation of a polymer having the specific microstructure according to the invention.

A clean and dry 75 dm$^3$ polymerization reactor with a stirrer was flushed with nitrogen and then with ethylene, and 22,000 g of norbornene melt were introduced at 50° C. While stirring, the reactor then was kept at a temperature of 50° C. and 15 bar of ethylene (superatmospheric pressure) were forced in the reactor.

Thereafter, 580 cm$^3$ of a toluene solution of methylaluminoxane (MAO solution, 10.1% by weight of methylaluminoxane of molecular weight 1300 g/mol according to cryoscopic determination) were metered into the reactor and the mixture was stirred at 50° C. for 15 minutes, the ethylene pressure being kept at 15 bar by topping up. At the same time, about 1000 mg of diphenylmethylene-(cyclo-pentadienyl)-(9-fluorenyl)-zirconium dichloride (metallocene catalyst) were dissolved in 1000 ml of MAO solution (concentration and quality as above) and preactivated by allowing to stand for 15 minutes. The solution of the complex then was metered into the reactor, and immediately thereafter 3.5 l of hydrogen were metered in, via a sluice, for regulation of the molecular weight. Polymerization then was carried out at 50° C. for 45 minutes while stirring (750 rpm), the ethylene pressure being kept at 15 bar by topping up. The contents of the reactor then were drained rapidly into a stirred vessel into which 200 cm$^a$ of isopropanol had been initially introduced. The mixture was added dropwise to 500 dm$^3$ of acetone and stirred for 10 minutes and the suspended polymeric solid was then filtered off.

The polymer which had been filtered off was then added to 2 dm$^3$ of a mixture of 2 parts of 3N hydrochloric acid and 1 part of ethanol, and this suspension was stirred for 2 hours. The polymer was then filtered off again, washed neutral with water and dried at 80° C. under 0.2 bar for 15 hours. An amount of product of 4500 g was obtained. A viscosity number (VN) of 103 cm$^3$/g and a glass transition temperature ($T_g$) of 123° C. were measured on the product.

A $^{13}$C-NMR spectrum of a solution of the polymer in hexachlorobutadiene and tetrachloroethane-D2 was recorded using a 400 MHz NMR apparatus (Bruker AM 400). As can be seen from FIG. 1, the spectrum has the characteristic peaks at 29.3, 33.3, 40.8 and 49.8 ppm.

Examples 2, 3 and 4

Preparation of other polymers having the specific microstructure of the invention.

Polymers having different glass transition temperatures were prepared analogously to Example 1, with the exception that the addition of hydrogen was not carried out. In addition, isopropylene-(cyclopentadienyl)-(9-fluorenyl)-zirconium dichloride was employed as the metallocene catalyst in Example 4.

Table 1 summarizes the various reaction conditions utilized in these examples.

The peaks in the $^{13}$C-NMR spectrum at 29.3, 33.3, 40.8 and 49.8 ppm which are characteristic of the microstructure of cycloolefin copolymers of Example 1 also were seen with the polymers made in accordance with Examples 2–4.

TABLE 1

| Example | Amount of norbornene (g) | Temperature (°C.) | Ethylene pressure (bar) | Amount of metallocene (mg) | Catalyst solution (ml) | Time (min) | Yield (g) | $T_g$ (°C.) | VN (cm$^3$/g) |
|---|---|---|---|---|---|---|---|---|---|
| 2 | 22000 | 70 | 10 | 500 | 500 | 140 | 4400 | 168 | 208 |
| 3 | 22000 | 70 | 15 | 500 | 500 | 80 | 5500 | 144 | 163 |
| 4 | 22000 | 70 | 10 | 25 | 500 | 35 | 4200 | 153 | 129 |

Example 5 (Comparison example)

Preparation of a polymer without the specific microstructure of the invention.

A polymer without the specific microstructure was prepared analogously to Example 1. Instead of diphenylmethylene-(cyclopentadienyl)-(9-fluorenyl)-zirconium dichloride, rac-dimethylsilyl-bis-(1-indenyl)-zirconium dichloride was used as the metallocene catalyst.

Table 2 summarizes the reaction conditions used in this comparative example. The $^{13}$C-NMR spectrum of the polymer according to Example 5 is shown in FIG. 2. The peaks at 29.3, 33.3, 40.8 and 49.8 ppm of the invention samples that are characteristic of the specific microstructure of the inventive samples are absent.

TABLE 2

| Example | Amount of norbornene (g) | Temperature (°C.) | Ethylene pressure (bar) | Amount of metallocene (mg) | Catalyst solution (ml) | Time (min) | Yield (g) | $T_g$ (°C.) | VN (cm$^3$/g) |
|---|---|---|---|---|---|---|---|---|---|
| 5 | 24800 | 70 | 15 | 3000 | 1000 | 220 | 5100 | 147 | 90 |

Example 6

The relationship between the $E_i$ values and the glass transition temperature in polymers having the specific microstructure of the invention was determined in this example.

Additional polymers having the specific microstructure of the inventive samples and with different glass transition temperatures were prepared analogously to Examples 1 to 3 using diphenylmethylene-(cyclopentadienyl)-(9-fluorenyl)-zirconium- dichloride, the glass transition temperature being varied via the incorporation of varying ratios of norbornene and ethylene. The spectra of all the polymers synthesized in accordance with this example have the characteristic peaks at 29.3, 33.3, 40.8 and 49.8 ppm.

These polymers were melted and shaped with an injection molding machine to dumb-bell bars according to DIN 53 457. The intrinsic E modulus values ($E_i$ values) were determined on these specimens. The glass transition temperatures ($T_g$) were likewise determined by means of the DSC.

Figure 3:
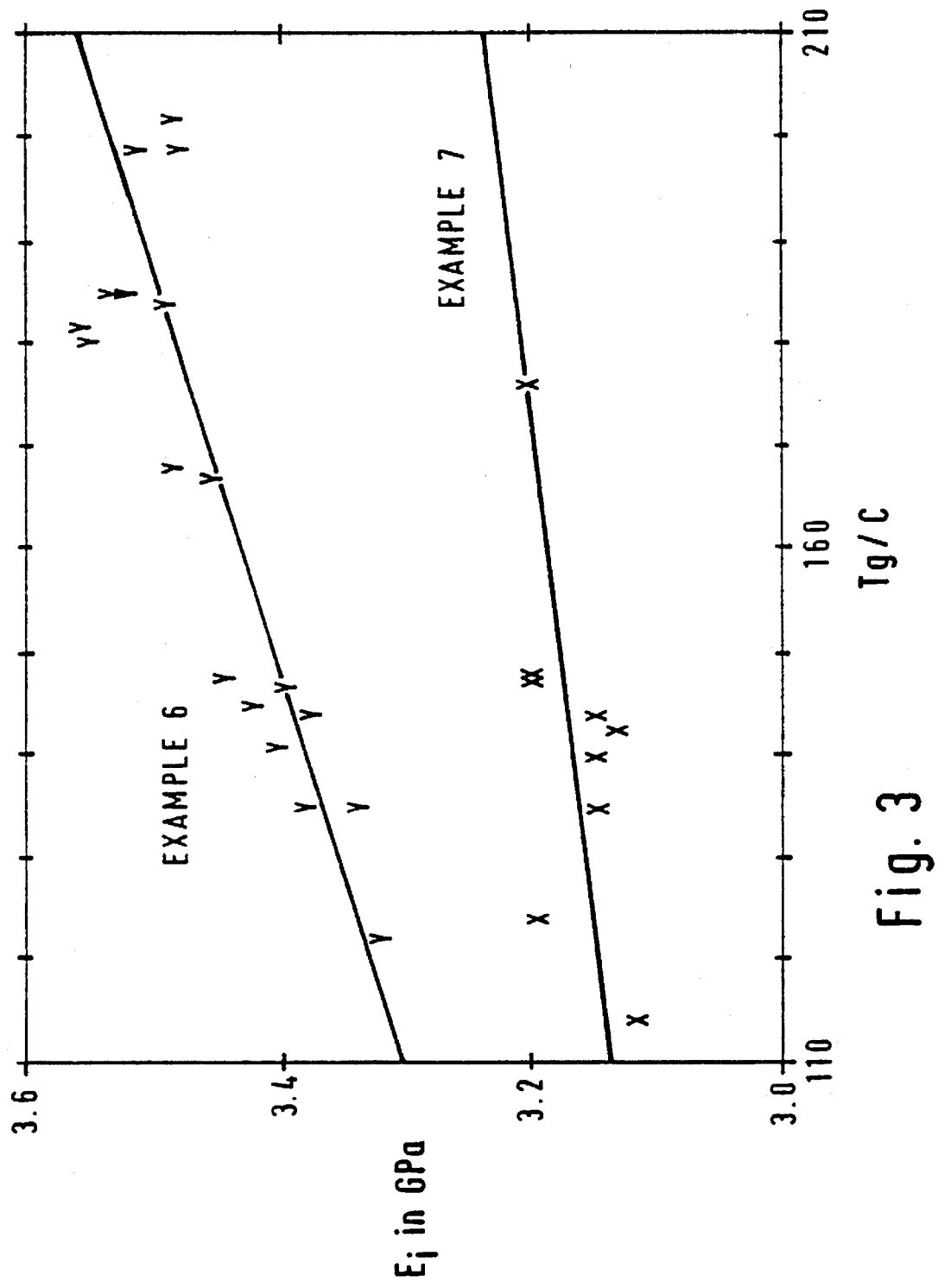
FIG. 3 illustrates the relationship between the intrinsic E modulus ($E_i$) and glass transition temperature for inventive samples (Example 6) and comparative samples (Example 7).

FIG. 3 illustrates the dependence of the $E_i$ values on the $T_g$ of the individual polymers. These polymers satisfy the relationship:

$$E_i=(0.0025[GPa/°C.]\times T_g[°C.])+B[GPa]$$

where B=2.93–3.18.

Example 7 (Comparison example)

The relationship between the $E_i$ values and the glass transition temperature in polymers without the specific microstructure of the invention was determined in this example.

Additional polymers without the specific microstructure of the inventive sample, and with different glass transition temperatures were prepared analogously to Example 4 except rac-dimethylsilyl-bis-(1-indenyl)-zirconium dichloride was used. The glass transition temperature was varied via the incorporation of varying ratios of norbornene and ethylene. In the spectra of these polymers, the characteristic peaks at 29.3, 33.3, 40.8 and 49.8 ppm were absent.

FIG. 3 illustrates the dependence of the $E_i$ values on the $T_g$ of the individual polymers. These polymers had $E_i$ values that did not satisfy, and that were significantly below those of the relationship:

$$E_i=(0.0025[GPa/°C.]\times T_g[°C.])+B[GPa]$$

where B=2.93–3.18.

Example 8

Production of a non-oriented film by using a cycloolefin copolymer having the specific microstructure of the invention.

The polymer from Example 3 was pressed in a sheet press at 250° C. to prepare a film 350 μm thick. The film was transparent and colorless. The mechanical properties of the film were as follows:

| | |
|---|---|
| E modulus | 2.6 GPa |
| Tear strength | 30 MPa |
| Elongation at break | 2% |

Example 9 (Comparison example)

Production of a non-oriented film by using a cycloolefin copolymer without the specific microstructure of the invention.

The polymer from Example 5 was pressed in a sheet press at 250° C. to prepare a film 320 μm thick. The film was transparent and colorless. The mechanical properties of the film were as follows:

| | |
|---|---|
| E modulus | 2.6 GPa |
| Tear strength | 50 MPa |
| Elongation at break | 3% |

Example 10

Production of a rigid oriented film by using a cycloolefin copolymer having the specific microstructure of the invention.

The non-oriented film from Example 8 was stretched in a film stretching apparatus (Karo III from Brückner, Siegsdorf) at 180° C. longitudinally and transversely by in each case a factor of 2.3.

The mechanical properties of the film were:

| | |
|---|---|
| E modulus | 3.6 GPa |
| Tear strength | 47 MPa |
| Elongation at break | 2% |

Example 11 (Comparison example)

Production of are oriented film by using a cycloolefin copolymer without the specific microstructure of the invention.

The non-oriented film from Example 9 was stretched analogously to Example 10. The mechanical properties were:

| | |
|---|---|
| E modulus | 3.2 GPa |
| Tear strength | 60 MPa |
| Elongation at break | 2% |

Example 12

Production of a thermoformed component.

The film from Example 8 was heated to about 180° C. in a vacuum thermoforming machine and then shaped to a conical beaker in a cold thermoforming mold. The rigidity of the beaker was tested. Strips from the base of the beaker had an E modulus of 3.5 GPa.

Example 13 (Comparison example)

The film from Example 9 was shaped to a beaker analogously to Example 12. Testing of the rigidity gave an E modulus value of 3.1 GPa.

While the invention has been described in detail above with reference to particularly preferred embodiments illustrated in the examples, those skilled in the art will appreciate that various modification may be made to the present invention without departing from the spirit and scope thereof.

What is claimed is:

1. A film having at least one layer in which at least one of said layers comprises a non-ring opening cycloolefin copolymer, wherein the cycloolefin copolymer has an intrinsic E modulus ($E_i$) satisfying the following relation:

$$E_i = (0.0025[GPa/°C.] \times T_g[°C.]) + B[GPa]$$

where B=2.93–3.19 and $T_g$ is the glass transition temperature of the cycloolefin copolymer.

2. A film having at least one layer in which at least one of said layers comprises a cycloolefin copolymer, wherein the $^{13}$C-NMR spectrum of the cycloolefin copolymer has a peak at 40.8 ppm relative to TMS.

3. A film as claimed in claim 1, wherein the $^{13}$C-NMR spectrum of the cycloolefin copolymer has peaks at 29.3, 33.3, 40.8 and 49.8 ppm relative to TMS.

4. A film as claimed in claim 1, wherein said film is a single-layer film.

5. A film as claimed in claim 1, wherein said film is uniaxially oriented.

6. A film as claimed in claim 1, wherein said film is biaxially oriented.

7. A film as claimed in claim 1, wherein the cycloolefin copolymer comprises recurring units of the formula (I) and (II), and optionally, (III) and/or (IV) and/or (V):

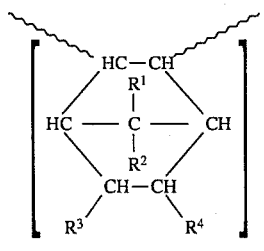
(I)

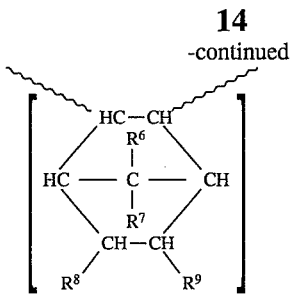
(II)

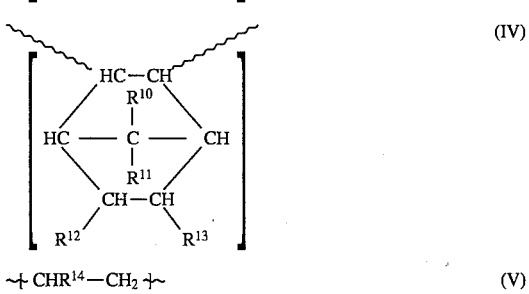
(III)

(IV)

$-\!\!+\!CHR^{14}-CH_2\!+\!\!-$ (V)

in which (III) is not the same as (I), $R^1$ to $R^5$ are the same or different and are selected from the group consisting of H, aryl, $C_1-C_{10}$-alkyl, $C_3-C_{10}$-cycloalkyl, and in which $R^6$ to $R^{14}$ are the same or different and have the meaning of $R^1$ to $R^5$, or may be $C_2-C_{10}$-alkenyl or $C_3-C_{10}$-cycloalkenyl, and in which the radical pairs $R^6/R^7$, $R^8/R^9$, $R^{10}/R^{11}$ and/or $R^{12}/R^{13}$ in each case are bonded to one another and, together with the carbon atoms to which they are bonded, are a $C_4-C_{10}$-cycloalkyl or $C_4-C_{10}$-cycloalkenyl radical, which in turn can be bridged by a —$C(R^1,R^2)$-radical, in which $R^1$ and $R^2$ have the meanings given above for $R^1$ to $R^5$.

8. A film as claimed in claim 7, wherein $R^1$, $R^2$, $R^3$, $R^4$ and $R^5$ are hydrogen.

9. A film as claimed in claim 1, wherein the cycloolefin copolymer has been prepared using a metallocene catalyst system.

10. A film as claimed in claim 1, wherein the glass transition temperature of the cycloolefin copolymer is between 50° and 250° C.

11. A film as claimed in claim 1, wherein the cycloolefin copolymer has a viscosity number of between 25 and 500 ml/g measured in decalin at 135° C.

12. A film as claimed in claim 1, said film further comprising 0 to 2% by weight of inert particles, based on the weight of the film.

13. A capacitor dielectric film comprising a film as claimed in claim 1.

14. An electrical insulation comprising a film as claimed in claim 1.

15. A packaging film comprising a film as claimed in claim 1.

16. A reproduction film comprising a film as claimed in claim 1.

17. A display window for LCD cells comprising a film as claimed in claim 1.

* * * * *